United States Patent [19]

Kemper

[11] Patent Number: 4,694,701
[45] Date of Patent: Sep. 22, 1987

[54] RADIALLY ORIENTED NUTATIONAL TRACTION DRIVE TRANSMISSION WITH LARGE RANGE OF SPEED RATIOS

[75] Inventor: Yves J. Kemper, Birmingham, Mich.

[73] Assignee: Tractiontec Corporation, Bloomfield Hills, Mich.

[21] Appl. No.: 824,664

[22] Filed: Jan. 31, 1986

Related U.S. Application Data

[63] Continuation-in-part of Ser. No. 797,481, Nov. 13, 1985, abandoned, which is a continuation-in-part of Ser. No. 746,230, Jun. 18, 1985, abandoned, which is a continuation-in-part of Ser. No. 739,414, May 30, 1985, abandoned.

[51] Int. Cl.$^4$ .................. F16H 15/44; F16H 15/16
[52] U.S. Cl. .................................. 74/191; 74/796
[58] Field of Search .............. 74/191, 796, 190, 190.5, 74/193, 690, 200

[56] References Cited

U.S. PATENT DOCUMENTS

| | | | |
|---|---|---|---|
| 3,153,353 | 10/1964 | Voigt | 74/751 |
| 3,517,572 | 6/1970 | Schmid | 74/710.5 |
| 4,266,446 | 5/1981 | Fritsch | 74/796 |
| 4,435,995 | 3/1984 | Welander | 74/711 |
| 4,524,642 | 6/1985 | Fritsch | 74/796 |

FOREIGN PATENT DOCUMENTS 227060 10/1922 Fed. Rep. of Germany ........ 74/751
282242 2/1931 Italy .

Primary Examiner—Philip C. Kannan
Attorney, Agent, or Firm—Robert F. Ziems

[57] ABSTRACT

A continuously variable traction drive transmission of the class including three working bodies, two of which are concentric with a first transmission axis, the other of which is concentric with a second axis intersecting and inclined with respect to the first axis, and wherein the points of rolling friction contact lie in diagonal quadrants defined by the first axis and a line perpendicular to the first axis at the intersection thereof with the second axis. The body concentric with the second axis includes two oppositely convergent cone-like rolling surfaces of revolution about the second axis which are held in rolling friction engagement with annular plate-like members forming one of the two bodies concentric with the first axis. The other of the two bodies concentric with the first axis carries the body on the second axis in nutation and continuously variable speed ratios are achieved by adjusting the angle of first and second axis through 90° to shift the points of contact between adjacent diagonal quadrants to reverse the rotation of the body concentric with the second axis.

19 Claims, 10 Drawing Figures

FIG. 2.
FIG. 3.
FIG. 4.
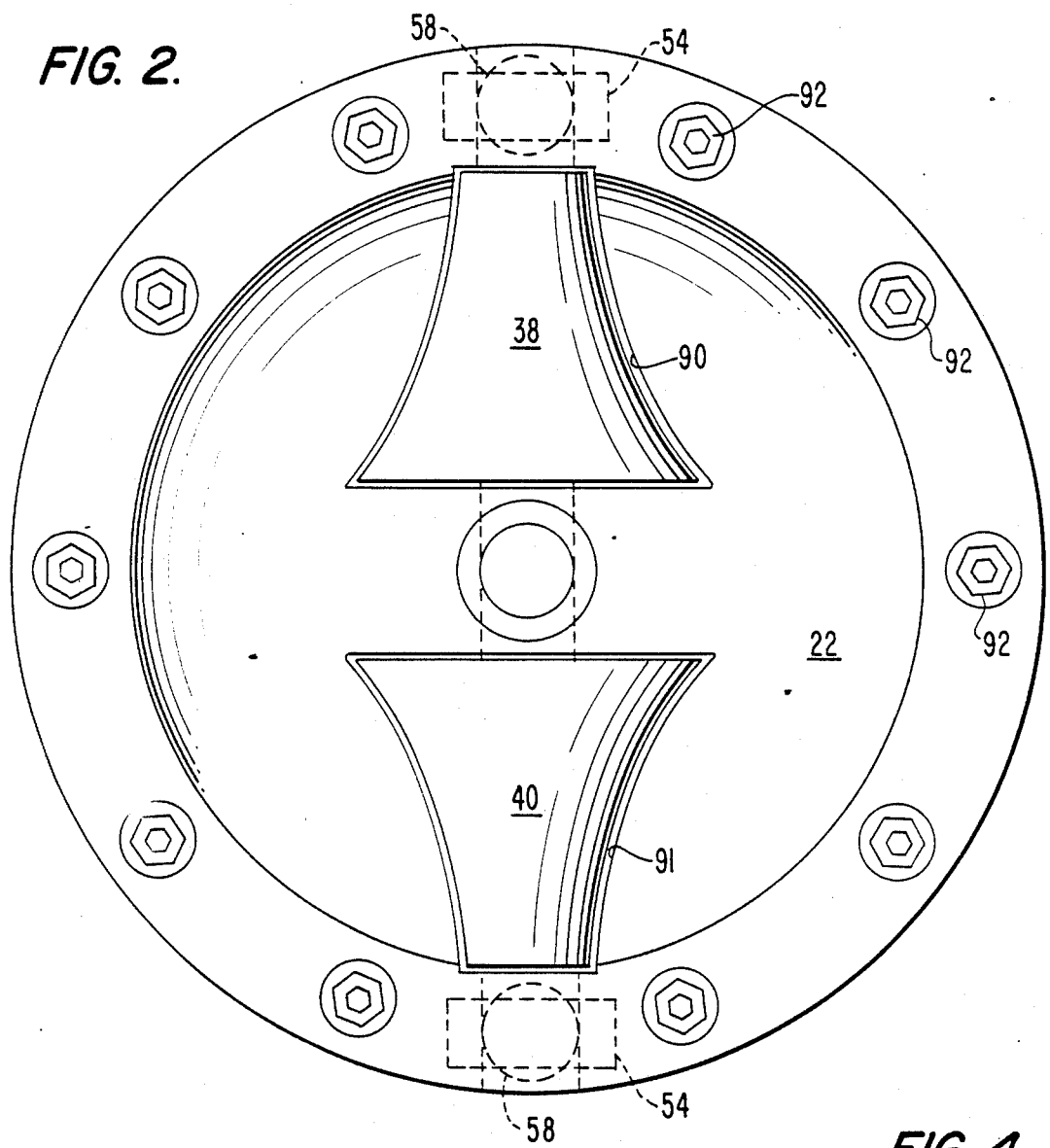
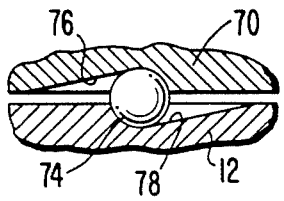
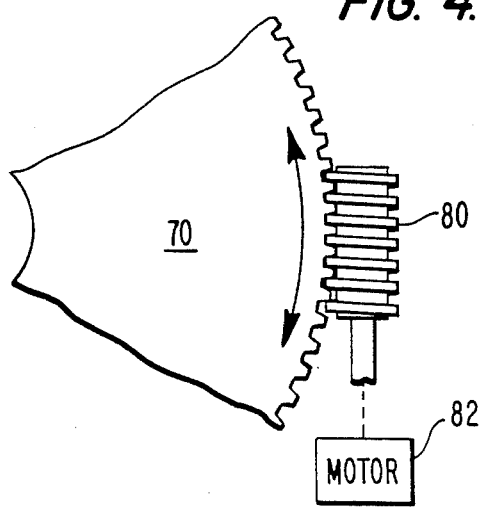

RADIALLY ORIENTED NUTATIONAL TRACTION DRIVE TRANSMISSION WITH LARGE RANGE OF SPEED RATIOS

This is a continuation-in-part of U.S. application Ser. No. 797,481 filed Nov. 13, 1985 now abandoned, in turn a continuation-in-part of pending U.S. application Ser. No. 746,230 filed June 18, 1985 now abandoned, in turn a continuation-in-part of abandoned U.S. application Ser. No. 739,414 filed May 30, 1985 by Yves Jean Kemper.

BACKGROUND OF THE INVENTION

This invention relates to continuously variable transmissions and, more particularly, it concerns an unique geometry and gear system for such transmissions by which the range of available speed ratios as increased by an order of magnitude over prior transmissions of comparable performance without compromise of transmission size or overall configuration.

U.S. Pat. Nos. Re. 29,328, 30,981 and 4,112,780 exemplify several embodiments of a continuously variable, mechanical power transmission in which three frame-supported working bodies operate to transmit a mechanical power input to a rotatable output at infinitely variable output/input speed ratios within the design range of the transmission. For purposes of definition in this background discussion as well as in the ensuing detailed description of the present invention and in the appended claims, the three working bodies may be termed, respectively, an "alpha body" which is supported by the transmission frame to be concentric with a first or primary transmission axis, a "beta body" which is supported by the alpha body to be concentric with a second axis inclined with respect to and intersecting the first axis at a point of axes intersection, and an "omega body" carried by the frame to be concentric also with the first axis. Although any one of these three bodies may be rotatable on the respective axes with which they are concentric, one of the three is held against rotation to provide a reaction torque whereas the other two bodies are rotatable and coupled either directly or by gearing to the respective input and output shafting of the transmission.

It is to be noted that the terms "alpha body," "beta body" and "omega body" are completely arbitrary and as such, do not restrict the components designated thereby either to the class of transmission represented by the disclosure of to the aforementioned patents or to specific structure to be described hereinafter. The terms will, however, lend consistency of definition in the description to follow and facilitate an understanding of various speed relationships to be expressed by algebraic equations.

The continuously variable speed ratio capability of such transmissions is achieved by providing one of the beta and omega bodies with a pair of rolling or traction surfaces which are of revolution about the concentric body axis and which are of variable radii along that axis in symmetry with the point of first and second axes intersection. Physically, the rolling surfaces thus defined may be provided at the ends of a generally cylindrical beta body rolling against generally plate-like omega body members as in U.S. Pat. No. Re. 29,328, or one of the beta and omega bodies may be of biconical configuration and extend within the other of the beta and omega bodies, the latter being manifested as a pair of ring members as represented by several of the embodiments disclosed in U.S. Pat. No. Re. 30,981. The pairs of rolling surfaces on the beta and omega bodies are retained in frictional engagement with each other at two contact points or zones capable of positional adjustment to vary the ratio of the beta body surface radius ($R_b$) to the omega body surface radius ($R_w$). Thus, if the alpha body is rotatable at a velocity ($\overset{\circ}{\alpha}$) about the first axis, the rotational speed of the beta body about the second axis in the ($\overset{\circ}{\alpha}$) frame of reference is ($\overset{\circ}{\beta}$) and the rotational speed of the omega body on the first axis is ($\overset{\circ}{\omega}$) then the respective speeds of the three bodies are related by the following equation: equation $$\overset{\circ}{\omega} - \overset{\circ}{\alpha} + \overset{\circ}{\beta} R_b/R_w = 0. \tag{1}$$

A generally preferred mode of operating such transmissions has been to apply an input torque to the alpha body to carry the beta body in nutation and hold the omega body against rotation ($\overset{\circ}{\omega}=0$). The beta body is linked with an output shaft rotatable on the first axis by gearing having a ratio factor (k) which theoretically may be of any value and also may be made either positive or negative depending on the particular arrangement used. In light of the foregoing, going, where $\overset{\circ}{\theta}$ is unit output speed and taking into account the gearing ratio (k), the output/input speed ratio of the unit is determined by an equation:

$$\overset{\circ}{\theta}\overset{\circ}{\alpha} = 1 - k\rho. \tag{2}$$

A principal advantage of operating in the mode represented by equation (2) is that the physical parameters of such transmissions readily accommodate a range of values for the function (k$\rho$) which permit a continuously variable output/input speed ratio range of from zero to 1 ($1.0 < k\rho < 2.0$). Also, this range may be shifted to include an output reversal through zero merely by selecting a gear ratio (k) so that the function (k$\rho$) brackets a numerical value of 1 (e.g., $1.5 > k\rho > 0\ 7$).

A geometric characteristic common to all embodiments of traction drive transmissions represented by the disclosures of the cited patents is that the points of rolling friction contact, which are in a plane containing the first and second axis, always lie outside of the areas of that plane subtended by the first and second axes. This characteristic of the prior transmissions is due in part to the relatively small angle subtending the first and second axes but the size of that angle is not the sole contributing factor. The geometric variation available to rolling surface configuration is also a factor. Although a wide variety of rolling surface configurations may be used in the prior transmission embodiments, it is believed that the described geometric characteristic has the effect of limiting the range of available beta/omega surface radius ratios and thus the intrinsic speed ratio range of the transmission.

While traction drive transmissions of the class exemplified by the aforementioned patents have demonstrated a capacity for highly efficient operation in the transmission of power at any speed ratio within the range of the transmission design, the geometry of such transmissions is also restrictive to dimensional proportioning. For example, in embodiments involving circumferential enclosure of the beta and omega bodies, one within the other, speed ratio range is limited to variation of the radius ratio factor $\rho$ which can be achieved by axial movement of the omega rings along the surfaces of the beta cones. Increased speed ratio range can be accomplished either by additional gearing or by increasing the axial length of the transmission. While the increased length is not a problem to many drive line applications, it can be a serious impediment to use of the transmission particularly in automobile drive trains where space available for an engine/transmission assembly is limited. This is especially true of front-wheel drive power trains for automotive vehicles.

In a prior copending U.S. patent application Ser. No. 724,746, filed April 18, 1985 by Yves Jean Kemper, now U.S. Pat. No. 4,630, 494, issued Dec. 23, 1986 many of the limitations of continuously variable transmissions of the nutating traction drive type are avoided by a near radial orientation of the beta body axis relative to the axis of alpha body rotation. Although the shape of the beta body is again generally biconical, it cooperates with a pair of plate-like omega bodies in a manner so that the two points of rolling friction contact always lie within the acute angle subtending the axes of the alpha and beta bodies. As a result of this geometry, the radius range $\rho$ in Equation (2) above is kept large relative to transmissions of the prior art but the length of the transmission is reduced significantly. In fact, the overall shape of the transmission disclosed in the prior copending U.S application, coupled with the nature of its rotating mass during operation, enables a physical substitution thereof for the flywheel of a conventional reciprocating engine to provide the functions of both a flywheel and a continuously variable speed ratio drive transmission.

SUMMARY OF THE INVENTION

In accordance with the present invention, the advantages of radially oriented nutating traction drive transmissions, such as overall compactness and dimensional proportioning, are retained with a doubling of speed ratio range through a combination of gearing ratio (the function k in Equation 2) and a provision for adjustment of the angle of the first (alpha) and second (beta) axes of intersection through 90° so that the points of rolling friction contact between the beta body and a pair of omega plates may be shifted, in the context of orthogonal quadrants I and III to quadrants II and IV. In the context of Equation 2, the function (k$\rho$) may be made to alternate between plus (+) and minus (−) values due to rotational reversal of the beta body when the points of rolling contact thereof with the omega plates is shifted between the quadrants as indicated. By selecting a gear ratio factor (k) which is the reciprocal of the maximum value of the radius ratio ($\rho$), the transmission may be made to operate in one variable speed ratio traction drive mode from an output/input speed ratio of approximately zero (0) as when the function k=$\rho$1, up to a minimum value of the function $\rho$. Because the function (k$\rho$) may approach but not reach a value of zero (0), it is not possible for the transmission to operate through a speed ratio of one (1) in a traction drive mode. The arrangement of gearing, however, in combination with a hydraulic motor to which it is connected, enables the use of a transitional hydromechanical drive to vary the output/input speed ratios continuously through one or unity. Thereafter, by shifting the quadrants in which the contact points are located, the direction of the beta body reverses so that the function k$\rho$ is added to 1 to provide an overdrive traction drive mode in which the output/input speed ratio may vary continuously from slightly greater than unity to a value approximating 2.

Physically, the transmission of the present invention is similar to the transmission embodiments disclosed in the aforementioned copending U.S. application Ser. No. 724,746 filed April 18, 1985 by Yves Jean Kemper. As such, the beta body is of generally biconical configuration and retained by the alpha body in a manner facilitating adjustment of the angle of intersection between the axes of the alpha and beta bodies. The omega plates, which define surfaces of revolution about the first or alpha axis, extend in a general radial direction. In this instance, however, the angle through which the beta body axis may be adjusted relative to the alpha body axis extends through 90°, such as for example, from 80° to 100°. In this way, any one of the two conical rolling surfaces on the beta body may be made to engage either one or both of the omega plates.

The gear system by which movement of the beta body is linked to an output shaft involves reduction gearing, preferably in two stages, through an idler gear or gear set principally to achieve a relatively high gear reduction between the beta body and the output shaft of the transmission. To facilitate variation in the angle of axes intersection of the transmission, the idler is rotatable on an axis perpendicular to the plane containing both the first and second transmission axes. Also, the idler is coupled directly to a hydraulic motor carried within the alpha body and capable of being driven in opposite directions by an external, variable displacement, reversible pump. Thus, with the beta body axis oriented at 90° to the alpha body axis and with the traction surfaces out of contact, power is supplied directly to the output shaft by the hydraulic motor through the gearing to vary the output/speed ratio through unity in a transitional hydromechanical drive mode.

As an alternative to the hydromechanical drive, the transition between the two traction drive modes may be made by clutching the idler gear to ground through a gear having the same size as the gear linking the idler gearing and the beta body. In this way, the speed of the output shaft may be increased to a speed equal to the speed at which it is driven at the low end of the higher of the two traction drive modes.

A principal object of the present invention is, therefore, the provision of a nutating traction drive transmission by which the range of continuously variable speed ratios between an input shaft and a transmission output shaft may be greatly increased with substantially no change in the dimensional size or proportioning of the transmission. Other objects and further scope of applicability will become apparent from the detailed description to follow taken in conjunction with the accompanying drawings in which like parts are designated by like reference numerals.

BRIEF DESCRIPTION OF THE DRAWINGS

FIG. 2 is an end elevation, at a reduced scale, illustrating one side of the transmission alpha body in the embodiment of FIG. 1;

FIG. 3 is an enlarged fragmentary cross section on line 3—3 of FIG. 1;

FIG. 4 is a fragmentary side elevation illustrating schematically an adjusting mechanism for the omega plates of the invention;

DETAILED DESCRIPTION OF THE PREFERRED EMBODIMENTS

Figure 1:
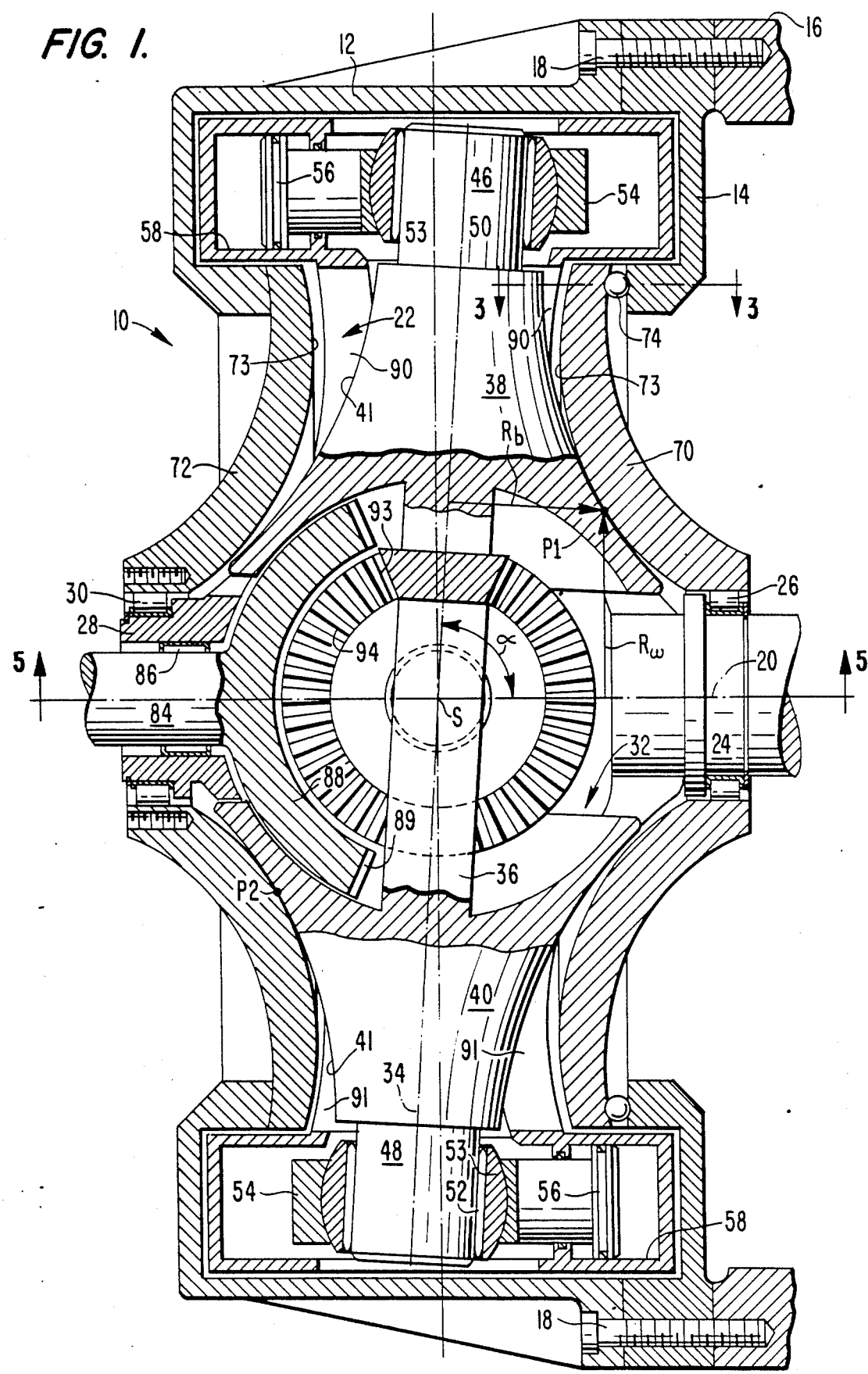
FIG. 1 is a cross section in a longitudinal plane containing the intersecting transmission axes of an embodiment of the invention.

In FIG. 1 of the drawings, an embodiment of a transmission unit in accordance with the present invention is generally designated by the reference numeral 10 and shown to include a frame in the form of a casing having two, annular parts 12 and 14 secured to each other and to a fixed support 16 by bolts 18. It will be appreciated that the fixed support 16 may be the block of an engine, for example or the frame of a power plant (not shown).

Supported within the casing 12, 14 for rotation on a first axis 20 is a disk-like alpha body 22. An input shaft 24 in the illustrated embodiment extends integrally from one side of the alpha body 22 and is rotatably supported on the axis 20 from the casing part 14 by a bearing 26. The opposite side of the alpha body 22 projects as an integral hub 28 supported also for rotation on the axis 20 by a bearing 30 in the casing part 12. The bearings 26 and 30 are designed to permit axial movement of the shaft 24 and the hub 28 relative to the casing parts 12 and 14 for reasons to be explained below.

A beta body of overall biconical configuration in the illustrated embodiment is designated generally by the reference numeral 32 and is supported by the alpha body for rotation on a second axis 34 which intersects the first axis 20 at an angle α. The beta body includes a central shaft 36 integral with a pair of cone members 38 and 40 at opposite ends. Each of the cone members 38 and 40, in the embodiment of FIG. 1, define an external concave beta rolling surface 41 of revolution about the second axis 34. The cones 38 and 40 terminate at their outer ends in cylindrical stub shafts 46 and 48 which are journalled by needle bearings 50 and 52, respectively, in externally spherical or self-aligning races 53. The races 53, in turn, are contained by yokes 54 integral or otherwise connected to pistons 56 slidable in cylindrical chambers 58 formed in the alpha body 22. Although not shown in the drawings, the cylinders 58 are of a type adapted to receive hydraulic fluid under pressure alternately at opposite sides of the pistons 56 with a corresponding venting of hydraulic fluid from the side of each piston opposite to the side exposed to such pressure. In other words, the pistons may be forced by fluid in either of opposite directions. Also, the yokes 54 slide in axial guideways (not shown) so that torque supplied in the alpha body 22 is transmitted directly to the ends of the beta body 32.

Supported by the respective casing parts 12 and 14 of the transmission frame are a pair of annular omega plate-like members 70 and 72 each having a radially convex omega rolling surface 73 of revolution about the first axis 20 in the illustrated embodiment to cooperate with the shape of the cones 38 and 40 thereof. In a functional context, the omega plates 70 and 72 are fixed against rotation with respect to the casing parts 12 and 14 though one or both may be rotatably adjustable as a means for varying the distance between the two plates 70 and 72. In the illustrated embodiment, the plate 72 is fixed to the casing part 12. The plate 70, on the other hand, is supported against the interior of the housing part 14 by balls 74. As may be seen in FIGS. 3 and 4, the balls 74 lie in ramps 76 and 78 machined in the plate 70 and casing part 14, respectively. By rotational adjustment of the plate 70, such as by a worm 80 under the control of a motor 82 as shown in FIG. 4, the balls 74 and ramps 76 and 78, arranged symmetrically about the plate 70, will operate to advance the plate 70 axially toward and away from the casing part 14 and thus toward and away from the opposing omega plate 72.

Power output from the transmission unit 10 is through a stub shaft 84 supported for rotation on the first axis 20 independently of the alpha body by bearings 86 between the shaft 84 and the inside of the alpha body hub 28. The shaft 84 carries a gear 88 forming part of a gear set to be described in more detail below and by which the shaft 84 is linked with the beta body shaft 36.

The disk-like configuration of the alpha body 22 may be appreciated from the illustration in FIG. 2 of the drawings. The beta body 32 is supported within the alpha body 22 so that the cones 38 and 40 are presented through windows 90 and 91 on opposite sides of the alpha body. Also, the alpha body is preferably formed of two parts divided in a central radial plane to facilitate assembly of the beta body therein. The two parts are secured such as by bolts 92 throughout the region unoccupied by the end journals on the beta body 32 and the windows 90 and 91.

In light of the foregoing and with reference again to FIG. 1 of the drawings, it will be seen that when the angle α between the axes 20 and 34 is other than 90°, the cones 38 and 40 of the beta body 32 are presented one to each opposite side of the alpha body 22. As a result, the outer rolling surface 41 of the cone 38 will engage the rolling surface 73 on omega plate 70 at a point P1 whereas the surface 41 of the other cone 40 will engage the surface 73 on the omega plate 72 at a point P2. Thus, the effective radius of the beta body, $R_b$, will be determined by the location of the contact points P1 and P2 along the axial extent of the surfaces 41 on the cones 38 and 40. The effective radius of the omega plates 70 and 72 or $R_w$ is the distance from the first axis 20 out to the respective contact points P1 and P2. The function ρ (see Equation 2) in the illustrated embodiment is equal to $R_w/R_b$ and will vary in maximum/minimum values depending on the precise geometry of the surface 41 on the cones and of the plate surface 73. To understand the invention, it may be assumed that the value of ρ is minimum at 0.5 (when the points P1 and P2 are closest to the axes 20 and maximum at 4.0 when the contact points P1 and P2 are at or near the outer ends of the cones 38 and 40. These values are exemplary only and may vary substantially depending on the configuration of the cones 38 and 40 in relation to the configuration of the plates 70 and 72.

Figure 5:
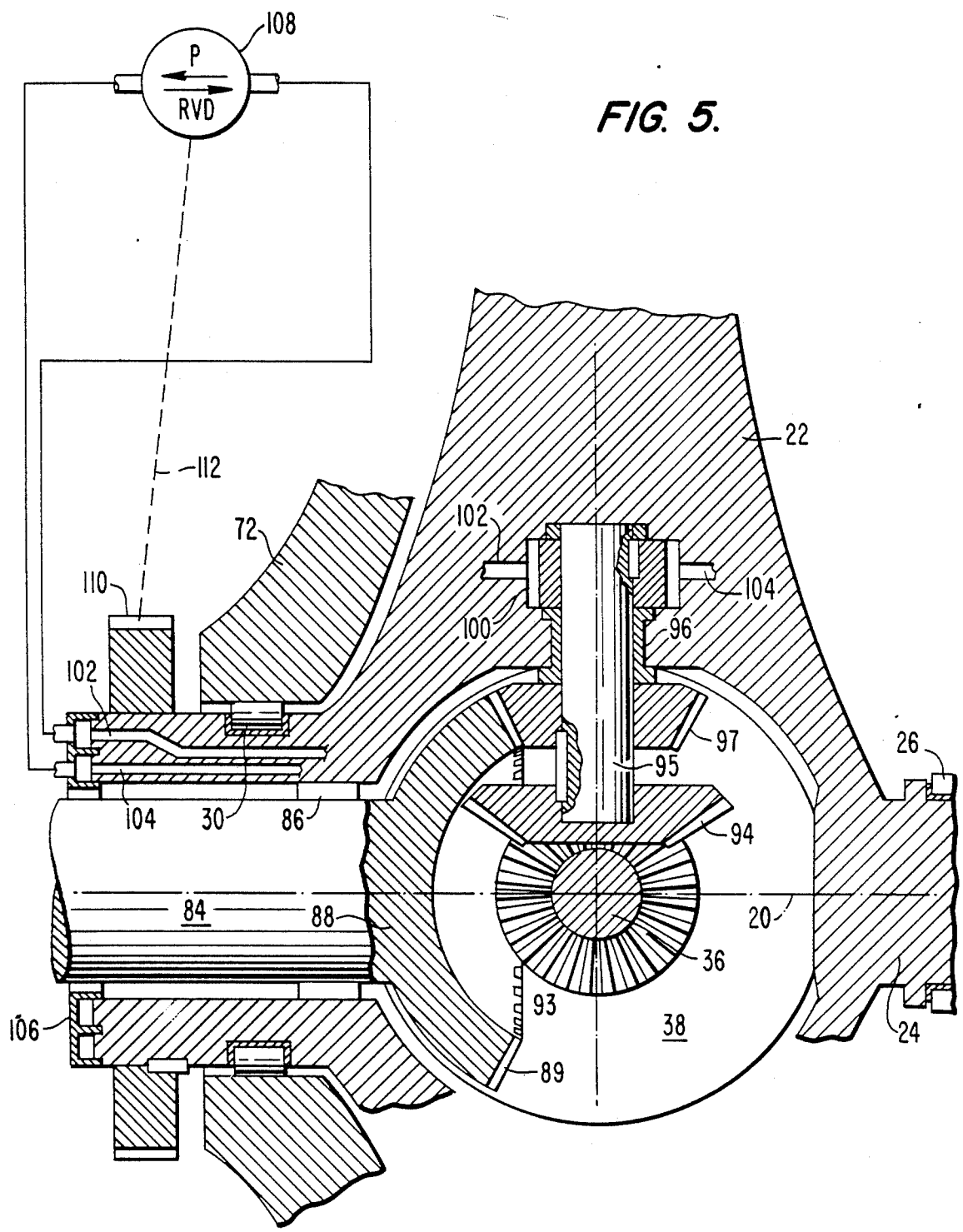
FIG. 5 is an enlarged fragmentary cross section on line 5—5 of FIG. 1.

An understanding of the gear set by which movement of the beta body 32 is linked with the output shaft 84 of the transmission 10 may be understood by reference to FIGS. 1 and 5 of the drawings. As mentioned above, the output shaft is made integral or otherwise rotatably fixed to a gear 88, the teeth 89 of which are disposed at the ends of a spherical sector in order that the reduction gearing to be described may be accommodated between the cones 38 and 40. The reduction train between the beta body 32 and the gear 88 includes a bevel gear 93 formed integrally with or otherwise fixed to the shaft 36 of the beta body 32. The gear 93 meshes with a relatively large idler gear 94 mounted by a shaft 95 in a bearing 96 secured in the alpha body 22. It will be noted that the axis of the idler gear 94 and thus of the shaft 95 is perpendicular to a plane containing the first axis 20 and the second axis 34. A second idler gear 97 is keyed for rotation with the first idler gear 94 on the shaft 95 to mesh directly with the teeth 89 on the output shaft gear 88. Also, the pitch lines of all gear teeth intersect the point S of transmission axes intersection.

As may be seen in FIGS. 1 and 5, the spherical sector configuration of the gear 88 on the output shaft 84 is important to spacial accommodation both of the output gear 88 in the space between the cones 38 and 40 and of the idler gear 94 in the plane of the teeth 89 of the output gear 88. Moreover, it will be noted that by selecting the bevel angle of the meshing gears 93 and 94 to be 30° and 60° relative to their respective axes, a reduction of one-half may be attained from the beta body carried gear pinion 93 to the idler 94. A second speed reduction of one-half is achieved by virtue of a similar arrangement in the relationship of the idler gear 97 to the output gear 88. Thus, in the illustrated embodiment, a composite speed ratio reduction from the beta body shaft carried gear 93 to the output shaft gear 88 of approximately 0.25 is attained. This value, moreover, is the gear ratio factor (k) in Equation 2.

As will be explained in more detail below, one mode of transmission operation involves a transitional drive connection of the input shaft 24 with the output shaft 84 by disengaging the rolling surfaces 41 and 73 and controlling rotation of the beta body 32 on the second axis 34. To this end and as shown in FIG. 5, the idler gear shaft 95 is keyed to a gear motor 100 contained in the alpha body 22 and supplied with hydraulic fluid in one direction through a conduit or port 102 in the alpha body hub 28. Discharge of fluid from the motor 100 in one direction of operation is through a port 104. Both ports 102 and 104 are in fluid communication, through a running seal 106, with an external, variable capacity, reversible pump 108 which may be driven by the alpha body or power input from a gear 110 on the hub 28 and associated linkage represented in FIG. 5 by the dashed line 112. In light of the pump 108 and motor 100, a hydromechanical drive system is provided so that with the rolling traction surfaces 41 and 73 out of contact, as when the angle α of axes intersection is at 90°, input power at the shaft 24 will be transmitted directly to the alpha body 22 and to the output shaft 84 through the gearing, at variable speed ratios determined by the capacity and pumping direction of the pump 108.

Figure 6A:
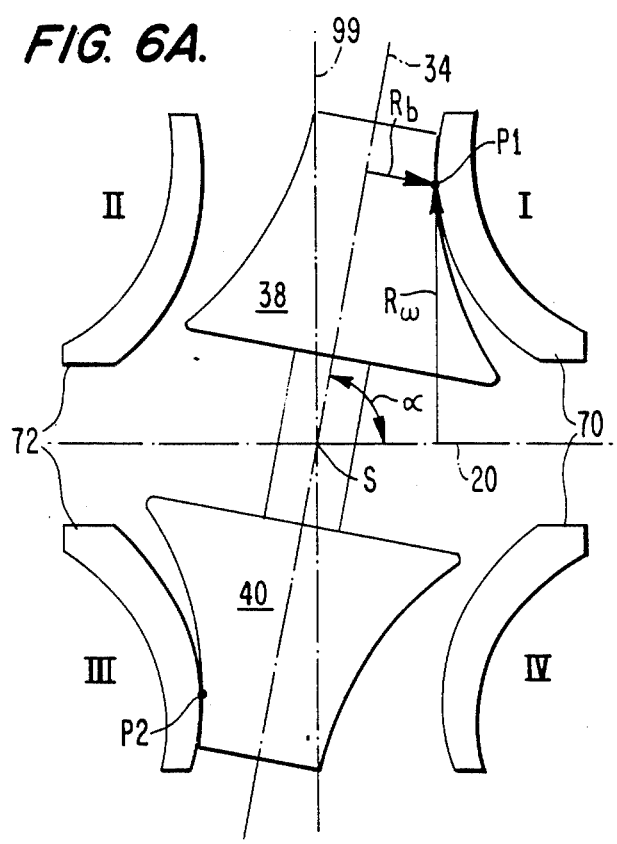
FIGS. 6A-6C are schematic views representing various operating phases of the transmission of the present invention.
Figure 6B:
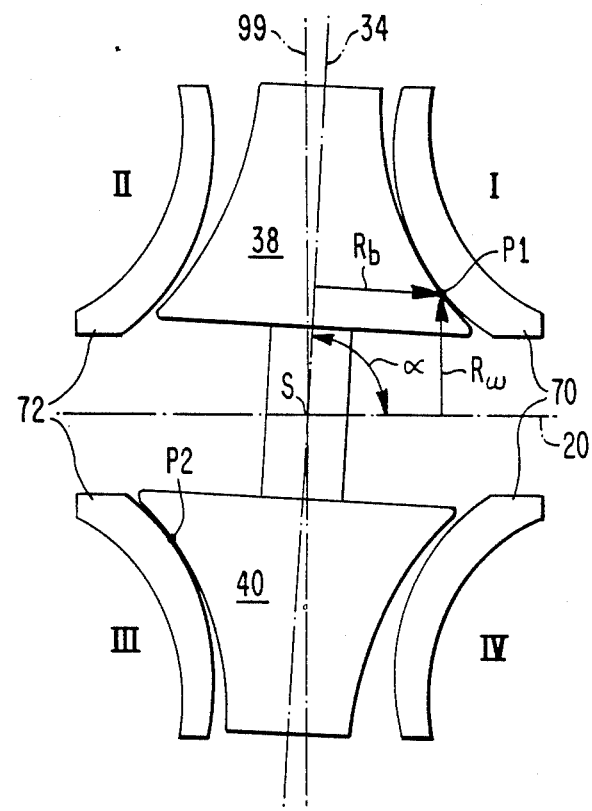
Figure 6C:
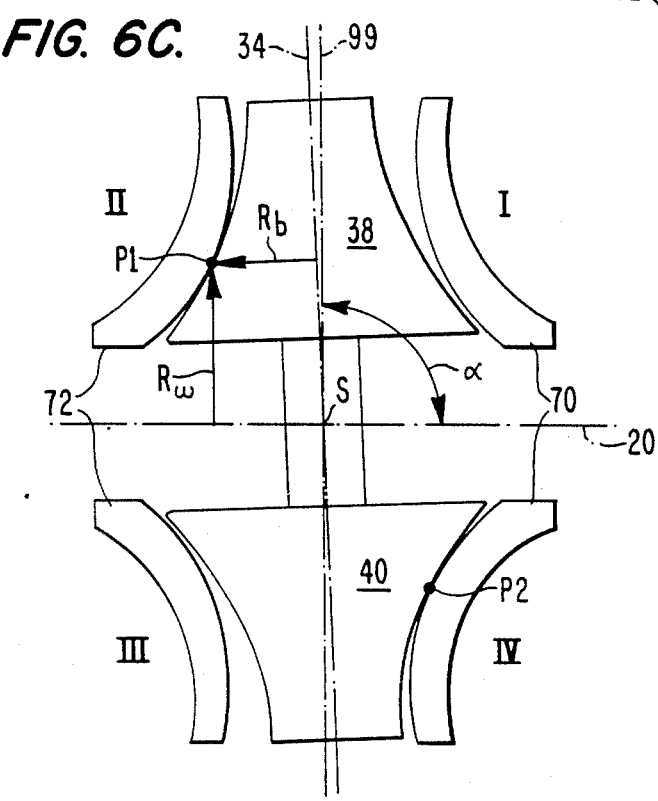

Given the exemplary parameters wherein $\rho$ varies from a numerical value of from 0.5 to 4.0 (0.5 $<\rho>$ 4.0) and o the function k equal to 0.25, it will be seen that rotation of the output shaft 84 will be zero (0) for any speed of the input shaft 24 when the function $\rho$ is maximum. This condition is depicted in FIG. 6A where the contact points P1 and P2 are in the diagonally opposite quadrants I and III and located toward the outer ends of the cones 38 and 40. In FIGS. 6A-6C, the quadrants I, II, III and IV are defined by the first axis 20 and a line 99 perpendicular to the axis 20 and passing through the point S of axes intersection. As the angle α is increased towards 90°, as depicted in FIG. 6B of the drawings, the contact points P1 and P2 move toward the axis 20 until the radius ratio $\rho$ reaches its minimum value of 0.5. In this condition of operation, the output/input speed ratio of the transmission or the ratio of the rotational speed of the output shaft 84 to the input shaft 24 is 0.875 or approaching unity. Also in this condition, rotation of the beta body about the second axis 34 is subtracting only slightly from the rotational speed of the alpha body and of the input shaft 24. As a result, the rotational speed of the beta body 32 on its own axis 34 nears zero (0). In other words, when the output/input speed ratio is unity, there will be no rotation of the beta body 32 and the cones 38 and 40 on the axis 34.

When the minimum value of the radius ratio $\rho$ is reached by increasing the angle α toward 90° in a first traction mode of operation, the transmission is shifted to a transitional hydromechanical drive mode by setting the angle α at 90°, disengaging the rolling surfaces 41 and 73 from contact with each other (such as by operation of the motor 82, FIG. 3), and operating the pump 108 to drive the motor 100. Although this condition or mode of operation is not shown in FIGS. 6A-6C, the axes 34 will be coincident with the line 99.

In the hydromechanical drive mode, assuming the speed ratio at the minimum value of the radius ratio $\rho$ is to be varied continuously through unity, the motor 100 and pump 108 are operated initially to retard rotation of the beta body 32 to zero (0). Thereafter, power is supplied by the pump 108 to drive the motor in a reverse direction to increase the rotational speed of the beta body (also in the reverse direction). In this latter condition, the hydromechanical driving of the beta body 32 will add to the rotational speed of the alpha body or input speed. When the speed ratio in the hydromechanical drive mode reaches a value of 1 +k$\rho$ for a minimum value of $\rho$, a shift is made from the hydromechanical drive mode to an overdrive traction drive mode depicted in FIG. 6C of the drawings. This transition is made simply by increasing the angle α past 90° so that the beta surfaces 41 on the cones 38 and 40 reengage the omega surfaces 73 on the plates but in different diagonal quadrants, specifically quadrants II and IV. At first contact in the quadrants II and IV, the rotational speed of the cones 38 and 40 about the axis 34 will be the same as the speed to which they were driven in the hydromechanical mode. Further increase in the angle α, however, toward 100°, for example, will increase the radius ratio $\rho$ back to its maximum value of 4.0.

Because the direction of rotation in the beta body about the axis 34 is reversed when shifting quadrants as depicted by FIGS. 6B and 6C, the function k$\rho$ in Equation 2 changes in sign. Accordingly, the output/input speed ratio advances from slightly greater than unity up to approximately 2 when $\rho$ equals 4.0.

Figure 7:
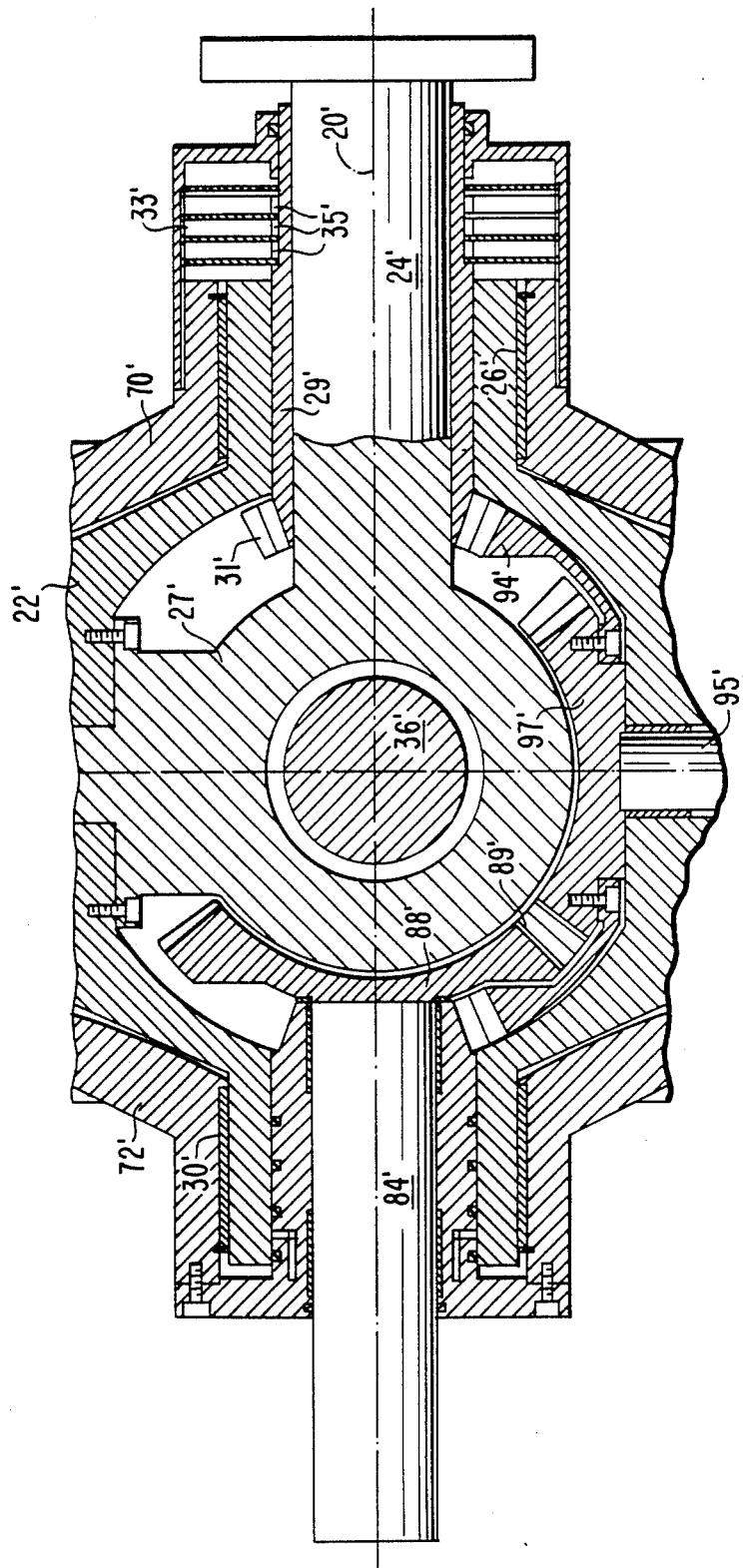
FIG. 7 is a cross section similar to FIG. 5 but illustrating an alternative embodiment for the transitional drive arrangement shown in FIG. 5.

In FIG. 7, an alternative embodiment to the hydromechanical transitional drive system of FIG. 5 is shown in which parts previously identified are designated by the same reference numerals but primed. In FIG. 7, the alpha body 22' is driven by an input shaft 24' fixed to a central boss 27' forming part of the alpha body. The input shaft 24' extends through an independently rotatable, hollow shaft 29' having a gear 31' on its inboard end which meshes with the large idler gear 94'. At its outboard end, the shaft 29' is releasably coupled to the nonrotatable omega plate 70' through a friction clutch 33'. The gear 31' is preferably the same size as the gear 93 which links the beta body to the large idler gear 94 shown in FIGS. 1 and 5 of the drawings. As a result, the gear ratio factor k for the train 31', 94', 97' and 89' is the same as it is for the train 93, 94, 97, and 89, in FIGS. 1 or 5. Also it is to be noted that the connection of the clutch 33' to the shaft 24' is through overrunning components 35' which allows the hollow shaft 29' to rotate in one direction independently of the clutch 33' but to be held against rotation upon engagement of the clutch and the resulting connection of the hollow shaft 29' to the omega plate 70'.

In operation using the embodiment of FIG. 7, the transmission is operated as described above with respect to FIGS. 6A through 6B in the sense that with the beta body axis in quadrants I and III, to a condition of maximum outspeed in that first mode of traction drive operation. When the beta body moves out of contact with the omega plates as it approaches 90° with respect to the primary axis 20, engagement of the friction clutch 33' is initiated. The speed of the shaft 29' and its gear 31' is slowed and because of the ratio factor of the gear train $30k$ in the gear train 31', 94', 97' and 89', the output shaft 84 will increase in speed up to a point of input shaft rotation plus the factor k or to a speed of 1.25 times the speed of the input shaft where k=0.25. Because the value of the ratio factor $\rho$ is less than 1, it is not necessary to engage the clutch 33' fully to prevent rotation of the gear 31 in order that the speed of the output shaft be synchronized with the speed at which it will be driven as the beta body surfaces reengage the omega plates in quadrants II and IV as shown in FIG. 6C. It is apparent, however, that the clutch 33' may be operated to maintain a load on the power shaft continuously during the transition between the first and second traction drive modes.

Figure 8:
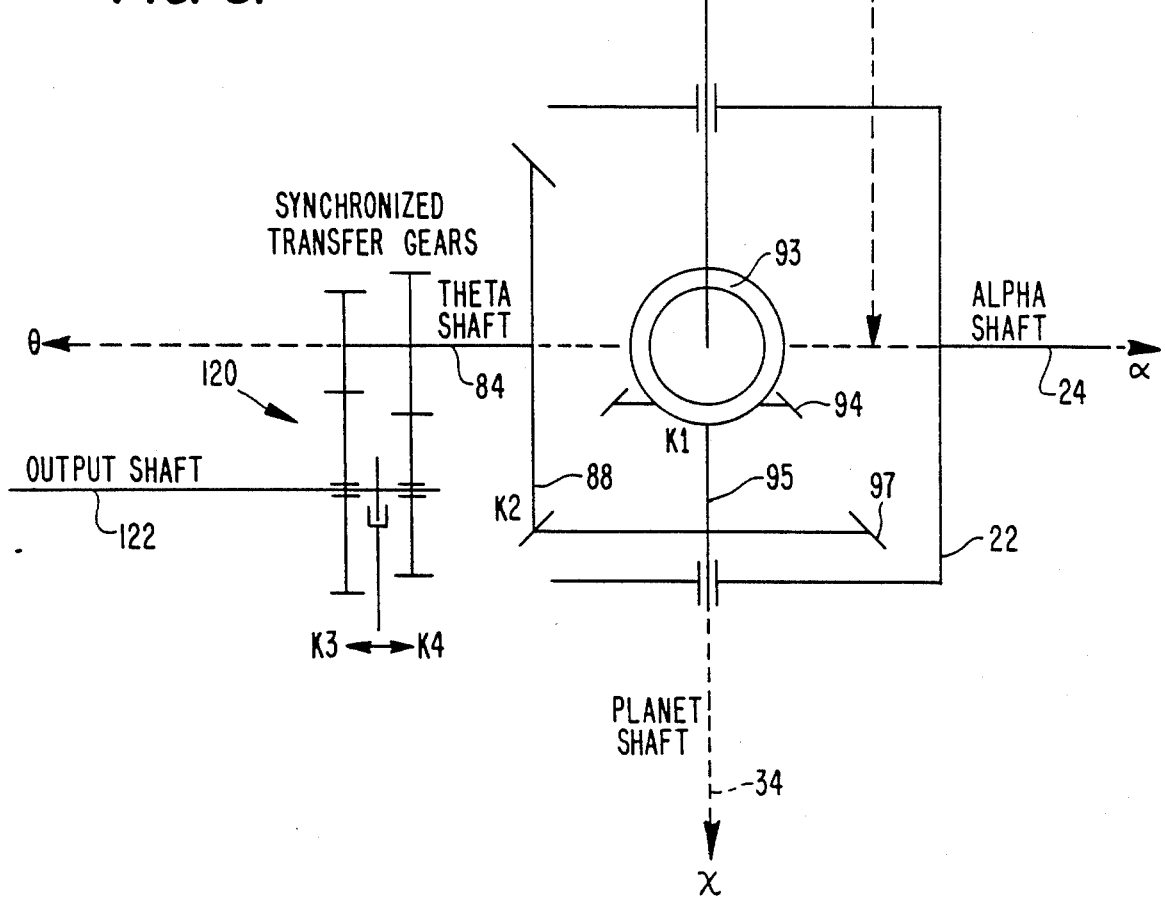
FIG. 8 is a schematic view illustrating still another embodiment of a system for effecting transition between operating modes.

In FIG. 8 of the drawings, components of the transmission unit previously described with reference to FIG. 1 are represented schematically in a drive system representing an alternative to the embodiments of FIGS. 5 and 7 from the standpoint of effecting a continuous drive transmission between a drive Mode A in which the cones 38 and 40 of the beta body are oriented in quadrants I and III (FIG. 6A) to operating Mode B in which the points of rolling friction engagement between the cones 38 and 40 with the plates 70 and 72 are in quadrants II and IV (FIG. 6C). In the embodiment of FIG. 8, the transmission output shaft 84 is connected through a two-speed gear transmission 120 to an inertial load driving output shaft 122. The alternative speed ratios between which the gearing 120 may be shifted are represented by ratio factors k3 and k4 in FIG. 8. The ratio k3, in the context of input/output speed ratios, is lower than the ratio k4 and is used during operation of the transmission unit 10 with the beta body axis 34 in quadrants I and III or in Mode A. The ratio k3, on the other hand, is used in Mode B or when the beta body axis 34 is shifted over to quadrants II and IV.

The effect of the gear box 120 may be appreciated by considering operation as described above with respect to FIG. 6A-6C. Thus, as the beta body is shifted from the position shown in FIG. 6A to FIG. 6B, assuming a constant input speed at the shaft 24, output speed of the shaft 84 and of the output shaft 122 through the gear box 120 increases to a maximum speed in Mode A as the angle $\alpha$ approaches 90°. On shifting the beta body through 90 degrees, the gear ratio k4 is shifted to the ratio k3. Because of the direct gearing connection of the shaft 84 with the beta body cones 38 and 40 through the gearing 88, 93, 94 and 97, shifting the two speed gear box 120 from k4 to k3 operates so that the inertial load connected to the output shaft 122 accelerates the cones 38 and 40 through a directional reversal of rotation about the beta body axis 34. Moreover, the ratio k3 drives the cones 38 and 40 so that as they re-engage the omega plates in quadrants II and IV they are rotating not only in the proper direction but at synchronous speed. Thereafter the overall transmission ratio is effected by adjusting the angle of the beta body with respect to the omega plates in quadrants II and IV.

The kinetic energy of the beta body cone assembly is transferred to the alpha body 22 when the cone assembly is decelerated, and then transferred from the alpha body to the cone assembly when the cones are accelerated in the other direction. This kinetic energy is equal to 0.2 kJ/0.2 Btu when the input speed is at 5,000 Rpm. Because the value of that energy is low and because, in major part it is transferred to and from the alpha body, it is possible to use synchronisers and avoid the use of multiple-disc clutches in the gear box 120.

The aforementioned operation not only effects a continuous overall variation of speed ratios in moving between the two modes of operation, but also has an inertial effect on the beta body which, on its own, will shift the angular orientation of the beta body through 90 degrees. In particular, the inertial forces acting on the beta body are represented by the following equation:

$$M_x = \dot{\alpha}^2(-I_0) \sin \alpha \cos \alpha + I\dot{\alpha}\dot{\beta}^* \sin \alpha$$

In the equation, the function $M_x$ represents a precessional moment operating to change the angle $\alpha$ of the beta body; the function $I$ is the moment of inertia of the beta body about the axis 34 thereof; the function $I_0$ is the moment of inertia of the beta body about the primary transmission axis or the first axis 20 described above with reference to FIG. 1; $\dot{\alpha}$ is the rotational speed of the alpha body 22 about its axis 20; an $\dot{\beta}$ is the rotational speed of the beta body on its axis 34. Thus the control system for shifting the beta body is capable of simplification relative to the embodiments previously described.

In light of the foregoing, it will be seen that the present invention provides the benefits not only of known nutating traction drive transmissions which have demonstrated a capacity for efficient transmission of high rates of power at continuously variable speed ratios, but does so in an extremely compact and desirably proportioned package. More importantly, the invention attains inherently a range of speed ratios greatly exceeding any prior traction drive transmission of comparable size.

It is contemplated and will be understood by those skilled in the art from the preceeding description and accompanying drawing illustrations, that changes and/or modifications may be made in the disclosed embodiment without departure from the present invention. Accordingly, it is intended that the foregoing description and accompanying drawings are illustrative only, not limiting, and that the true spirit and scope of the present invention be determined by reference to the appended claims.

I claim:

1. In a continuously variable traction drive transmission having a frame, an alpha body supported by said frame for rotation about a first axis, a beta body supported by said alpha body on a second axis intersecting said first axis at a point of axes intersection, said beta body having a pair of members on opposite sides of said point of axis intersection for defining beta rolling surfaces of revolution about said second axis, omega body means for defining a pair of omega rolling surfaces of revolution about said first axis, said beta and omega surfaces being in rolling friction engagement at two points of contact in a plane containing said first and second axes, said two points of contact lying in diagonally opposite quadrants defined by said first axis and a line perpendicular to said first axes at said point of axes intersection, and means for varying the radius ratio of said beta and omega surfaces at said points of contact, the improvement comprising:

means for shifting said points of contact between adjacent diagonal quadrants as defined by said first axes and said line so as to reverse the rotational direction of said beta body on said second axis.

2. The transmission recited in claim 1, wherein said means for varying the radius ratio comprises means for adjusting the angle of intersection between said first and second axes.

3. The transmission recited in claim 1, wherein said means for varying the radius ratio comprises means for adjusting the angle of first and second axes intersection between an angle of less than 90° and an angle of greater than 90°.

4. The transmission recited in claim 3, wherein said angle of axes intersection is variable between 80° and 100°.

5. The transmission recited in claim 1, wherein said radius ratio is variable between a maximum numerical value when said first and second axes intersect at a minimum acute angle and a minimum numerical value as said angle approaches 90°.

6. The transmission recited in claim 5, including an input shaft for driving said alpha body, an output shaft, and a gear reduction means for linking said beta body to said output shaft.

7. A transmission as recited in claim 6, wherein said gear reduction means provides a numerical speed reduction value which is the reciprocal of at least one numerical value of said radius ratio.

8. A transmission as recited in claim 6, wherein said gear reduction means comprises a relatively small drive pinion rotatable on said second axis with said beta body, a relatively large idler gear in mesh with said drive pinion and rotatable on an axis intersecting said point of axes intersection but perpendicular to the plane containing said first and second axes, a relatively small idler gear keyed for rotation with said relatively large idler gear and an output gear in mesh with said relatively small idler gear.

9. A transmission as recited in claim 8, wherein said output gear is formed as a spherical sector so that the circumference of said relatively large idler gear may pass through the plane of teeth on said output gear.

10. A transmission as recited in claim 8, including means for driving said output shaft from said input shaft through said gear reduction means independently of torque transmission through said beta body, said last mentioned means comprising a grounding gear in mesh with said large idler gear and friction clutch means for restraining rotation of said grounding gear against rotation in a direction so that the speed of said output shaft is increased in relation to said input shaft.

11. A transmission as recited in claim 10, including means for permitting free rotation of said grounding gear in a direction opposite to the direction in which the speed of said output shaft is increased relative to said input shaft.

12. A transmission as recited in claim 6, wherein said gear reduction means include an idler gear journalled in said alpha body and comprising a hydraulic motor rotatably linked to said idler gear.

13. A transmission as recited in claim 12, including means including said hydraulic motor for establishing a hydromechanical drive mode in which rotation of said beta body on said second axis is controlled by said hydraulic motor independently of said rolling surfaces.

14. A transmission as recited in claim 6, comprising means for driving said output shaft from said input shaft through said gear reduction means independently of torque transmission through said beta body.

15. A transmission as recited in claim 14, wherein said last mentioned means comprises hydromechanical means for driving said gear reduction means.

16. A transmission as recited in claim 14, wherein said last mentioned means comprises clutch means for operating said gear reduction means to increase the speed of said output shaft relative to said input shaft.

17. A transmission as recited in claim 6, wherein said means for shifting said points of contact between adjacent diagonal quadrants comprises means connected to said output shaft for accelerating said beta body in rotation on said second axis through a reversal of rotational direction.

18. A transmission as recited in claim 17, wherein said means connected to said output shaft comprises a shiftable two speed gearing means connecting said output shaft to an inertial load.

19. A transmission as recited in claim 18, wherein said gearing means includes means for defining a pair of speed ratio factors related respectively to the maximum speed of said output shaft with said points of contact in one of two adjacent diagonal quadrants and the minimum speed of said output shaft in the other of said two adjacent diagonal quadrants.

* * * * *